United States Patent [19]

Buryakov et al.

[11] 4,392,551

[45] Jul. 12, 1983

[54] DOSING DEVICE FOR FEEDING LUBRICANT TO FRICTION COUPLES

[76] Inventors: Viktor P. Buryakov, ulitsa generala Karpenko, 6, kv. 24, Nikolaev; Gennady M. Ivanov, ulitsa 26 Bakinskikh komissarov, 8, korpus 4, kv. 40, Moscow; Mikhail I. Kislik, ulitsa Kosmonavtov, 82, kv. 8, Nikolaev; Pavel M. Kurgansky, ulitsa Kosmonavtov, 73, kv. 13, Nikolaev; Mark B. Shmotkin, ulitsa B. Morskaya, 17, kv. 2, Nikolaev; Eduard V. Eikhenvald, ulitsa Pljuschikha, 42, kv. 122, Moscow, all of U.S.S.R.

[21] Appl. No.: 286,685

[22] Filed: Jul. 24, 1981

[51] Int. Cl.$^3$ .............................................. F16N 25/02
[52] U.S. Cl. .................................. 184/7 D; 184/6.4; 137/625.16
[58] Field of Search ............... 184/7 D, 7 E, 7 F, 7 R, 184/6.4; 137/271, 596.13, 624.14, 625.14, 625.15, 625.16

[56] References Cited

U.S. PATENT DOCUMENTS

| | | | |
|---|---|---|---|
| 2,183,986 | 12/1939 | Corey | 184/7 E |
| 2,834,433 | 5/1958 | Higgens | 184/7 E |
| 2,996,147 | 8/1961 | Callahan | 184/7 D |
| 3,220,375 | 11/1965 | Gruber et al. | 184/7 D |
| 3,223,198 | 12/1965 | Gruber | 184/7 D |
| 3,409,104 | 11/1968 | Acker et al. | 184/7 E |
| 3,515,245 | 6/1970 | Obergefell et al. | 184/7 E |
| 3,921,760 | 11/1975 | Brownrigg | 184/7 E |

Primary Examiner—David H. Brown
Assistant Examiner—John E. Griffiths, Jr.
Attorney, Agent, or Firm—Steinberg & Raskin

[57] ABSTRACT

The dosing device includes a plurality of sections successively connected in the direction of the flow of the lubricant namely a valveless head section with a central supply duct, distributing sections and a valveless end section. The housing of each distributing section has a chamber accommodating a reciprocating distributing slide valve. The chamber is closed with closures limiting the reciprocation of the slide valve and defining two metering-out end chambers. Each chamber communicates with the reduced-diameter area of the distributing valve of the preceding section. The housing of each distributing section has central duct perpendicular to the axis of the cylindrical chamber, and outlet ducts. The inlets of the outlet ducts communicate with the cylindrical chamber, while the outlets of these ducts to feed the lubricant to the friction couples. In at least one distributing section the distributing slide valve is provided with means for rotating this valve about its axis through a predetermined angle and for retaining it in the rotated position. The shoulders of the slide valve, facing the metering-out end chambers, each have a single distributing passage. The inlet of this passage communicates with the relieved area of the valve, while its outlet opens onto the external surface of the shoulder. The section housing has other outlet ducts whose inlets are spaced about the perimeter of the wall of the cylindrical chamber, with the geometric axes of these inlets dividing the circumference of the chamber into predetermined angles.

16 Claims, 23 Drawing Figures

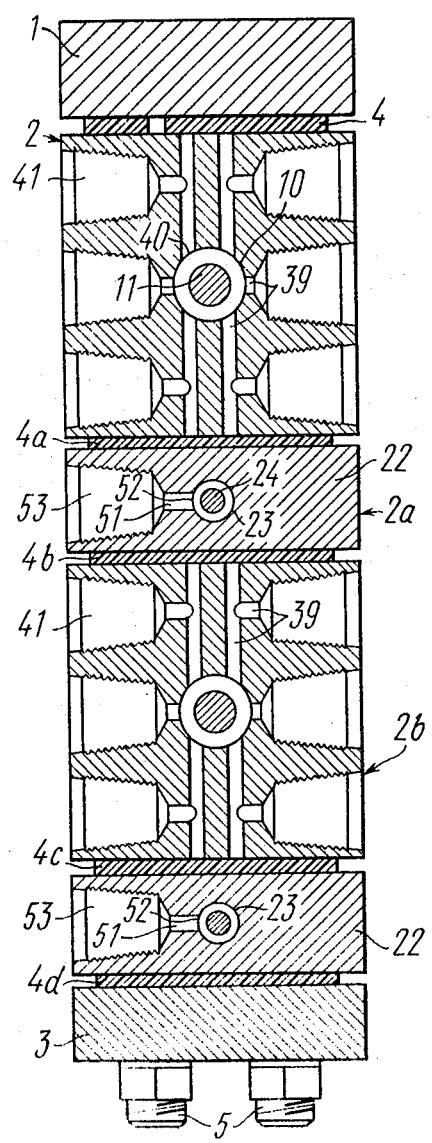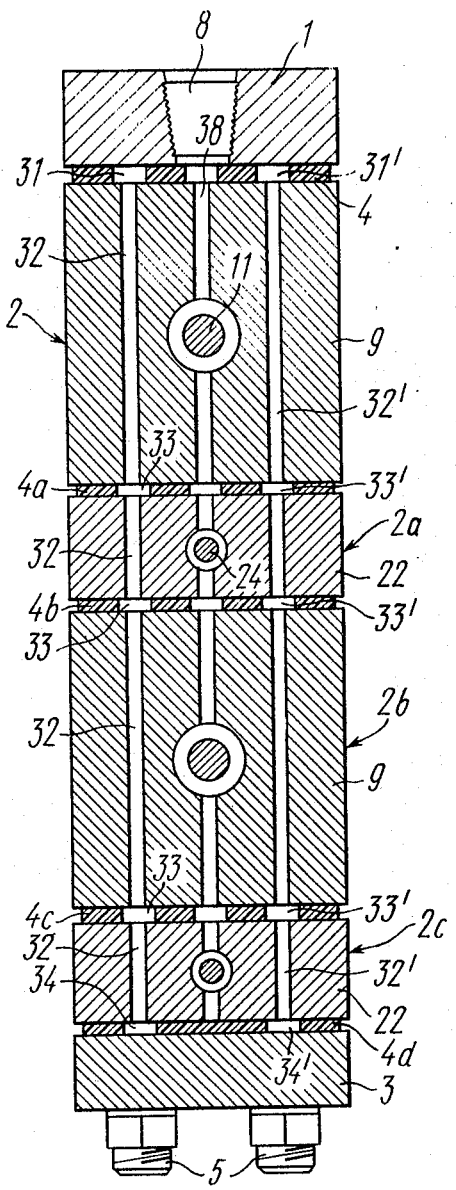

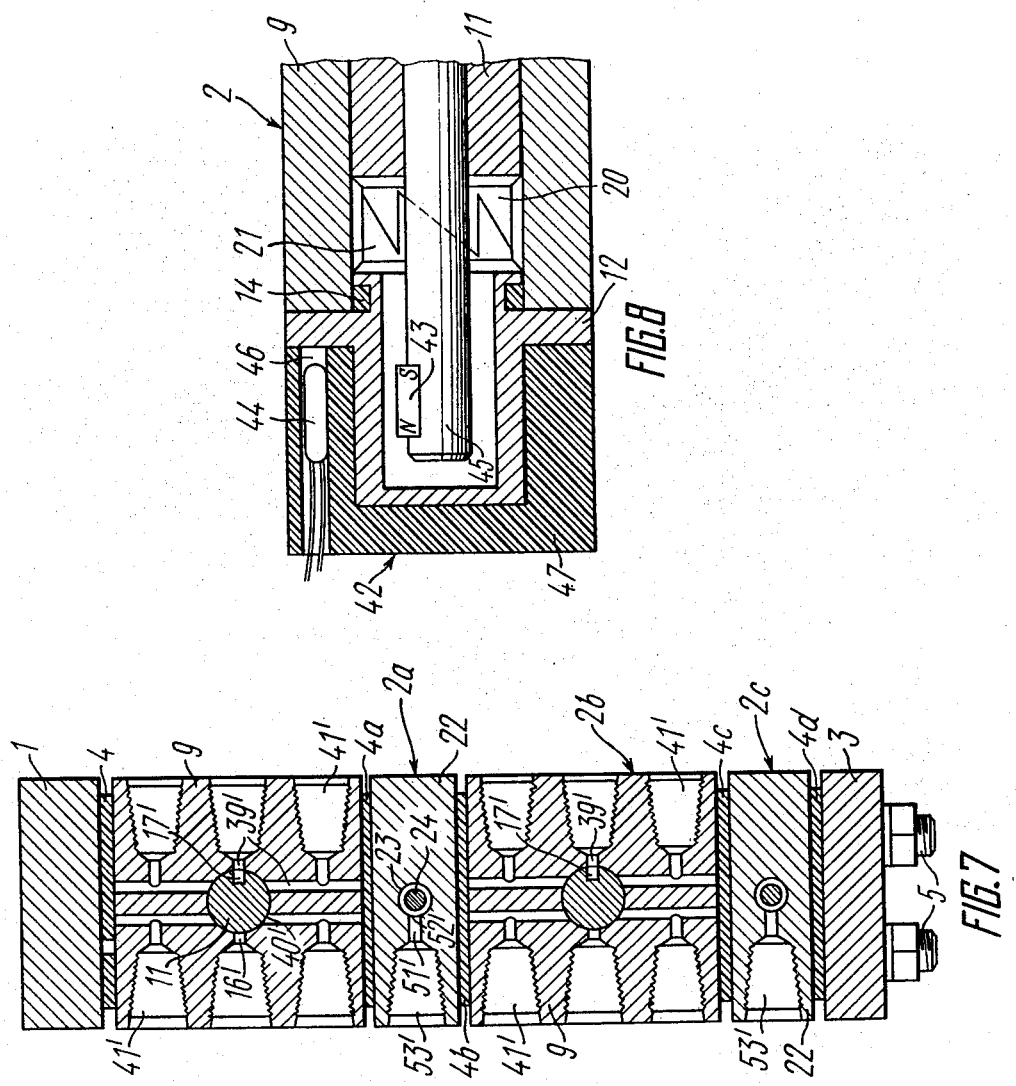

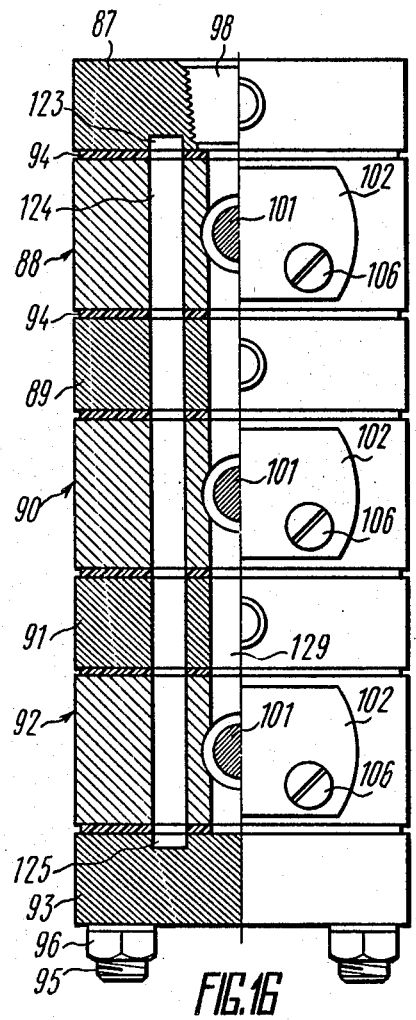
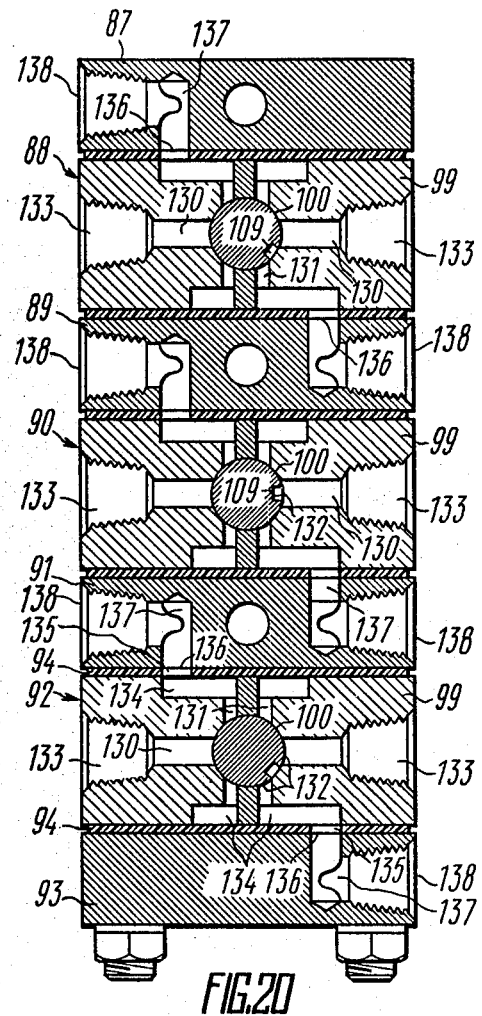
FIG.16
FIG.20

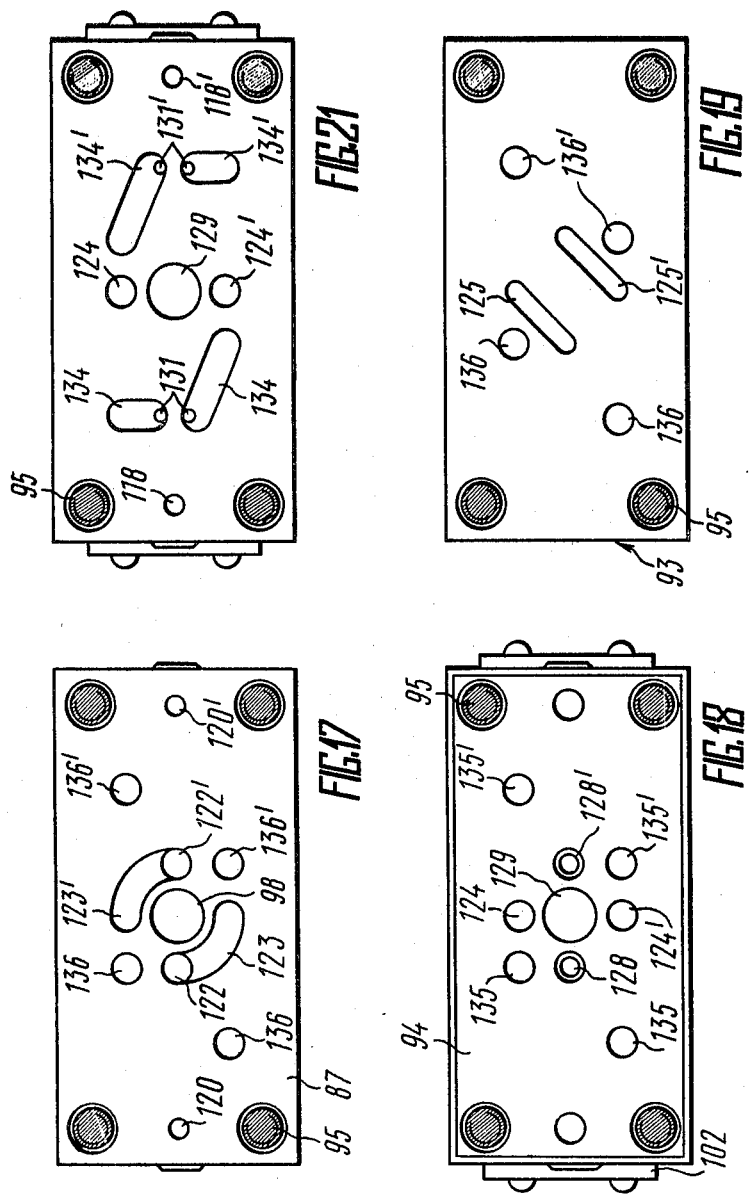

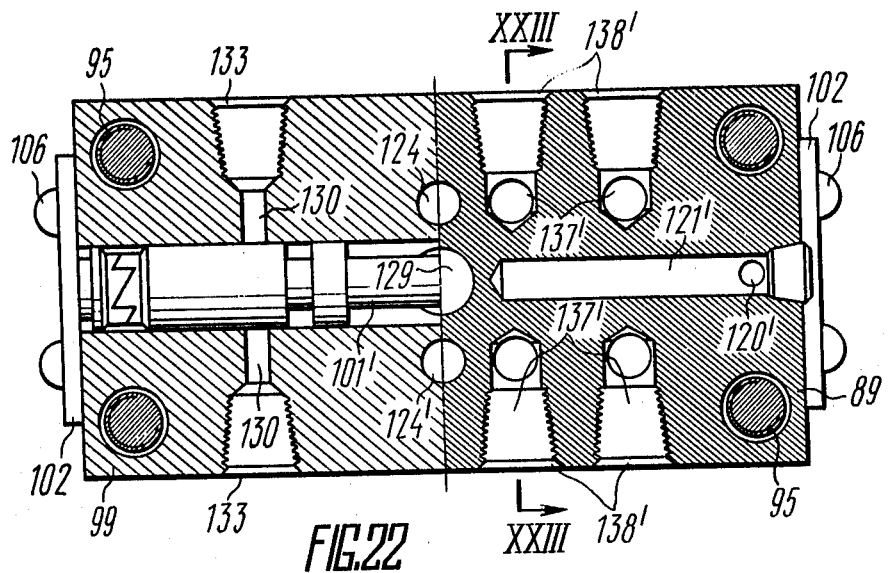
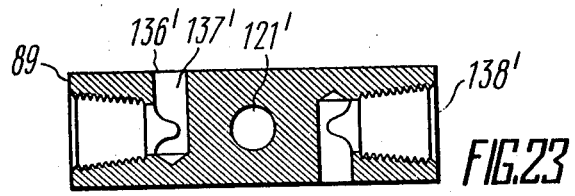

DOSING DEVICE FOR FEEDING LUBRICANT TO FRICTION COUPLES

The invention relates to lubricating apparatus, and more particularly it relates to dosing or metering-out devices for feeding a lubricant to friction couples.

The invention can be utilized to utmost effectiveness in single-line serial or successive lubricating systems of the types used in machine-tools, forging machinery, presses and other production machines.

The invention can be likewise effectively utilized in twin-line lubricating systems used in metallurgical machinery and conveyors.

At present, the total multitude of state-of-the-art metal-working machines is characterized by the ever-increasing percentage of precision machines and machines with a high degree of automation, including numerically controlled machine-tools. In machines of these kinds particularly strict requirements are put before their accuracy, failure-proof performance and durability of the mechanisms. These requirements are exceptionally strict when they concern the reliability of the performance of automatic machining lines, multiunit machines and NC machine-tools, since any failure of a part or an assembly on account of jamming, scoring or untimely wear might inflict heavy material losses.

These requirements are met to a high degree by incorporating highly efficient lubricating systems in the machines. Reliable and durable functioning of surfaces subject to friction in operation under varying working modes, duties and conditions can be provided for by the accurate selection of the amount or dose of the lubricant fed thereto and of the timing of its feed, as well as by monitoring the performance of every component of the lubricating system. Metered-out feed of the lubricant with predetermined timing and monitoring of the supply of the lubricant to the friction couples can be attained by using single-line series- or successive-type systems or twin line ones, of which the major component is the dosing or metering-out device.

There is known a dosing device for feeding a lubricant to friction couples, manufactured by Trabon, the US company, in Models "M" and "MJ".

This known dosing device includes a plurality of sections successively connected in the direction of the flow of the lubricant, viz. a valveless head section, distributing sections and a valveless end section. The sections have sealing gaskets interposed therebetween, and are assembled into a unit with aid of threaded studs and nuts. The valveless head section has made therein a central supply duct. The housing of each distributing sections has made therein a through cylindrical chamber accommodating a resiprocating distributing slide or spool valve. This cylindrical chamber is closed at its ends with closures limiting the reciprocation of the slide valve and defining therewith two metering-out end chambers. Each chamber communicates with the reduced-diameter or relieved area of the slide valve of the preceding upstream section. This communication of the chamber with the relieved area of the slide valve of the preceding section is effected through a passage defined by bores made in the respective housings of the preceding, or upstream section and of the successive, or downstream one, and by an opening provided in the gasket.

Furthermore, each distributing section has made therein a central through duct substantially perpendicular to the axis of the cylindrical chamber and intersecting the latter, and outet ducts. These ducts have each one its end communicating with the relieved area of the distributing valve, while the two outlets of the outlet ducts are open in the side and end face walls of the successive section.

The valveless end section has made therein ducts connecting each the relieved area of the slide valve of the terminal downstream distributing section with the metering-out end chamber of the first upstream distributing section.

This known dosing device is provided with means for monitoring the axial position of the slide valve, rigidly connected with the distributing valve of one of the sections. These means include a rod extending to the exterior of the device through a seal accommodated in the end closure.

The maximum number of lubricating points supplied by this dosing device is but twice the number of the distributing sections, since each distributing section is capable of feeding the lubricant to but two lubrication points, this being the number of the outlet ducts leading from the metering-out end chambers.

The greater the number of the lubrication points, the greater has to be not only the number of the distributing sections and the overall dimensions of the dosing device, but also the number of such devices, since strength limitations impose the definite maximum number of distributing sections assembled into a single dosing device. Furthermore, within one type of the Model of the dosing device, it is impossible to have substantially different values of the volumes of the metering-out end chambers.

It is an object of the present invention to reduce the overall dimensions of the dosing devices by cutting down the number of the distributing sections while maintaining the required number of the outlet ducts, and by appropriate arrangement of the outlets of the outlet ducts.

It is another object of the present invention to provide for substantial difference between the values of the flow rates through the outlet ducts in an operating cycle of the dosing device, during which the lubricant is fed to every lubricating point.

It is still another object of the present invention to provide for monitoring the supply of the lubricant to every outlet duct.

It is yet another object of the present invention to reduce the downtime of the lubricated equipment, owing to the accelerated locating of the point of failure.

With these and other objects in view, the essence of the present invention resides in a dosing device for feeding lubricant to friction couples, comprising a valveless head section with a central supply duct, a plurality of distributing sections wherein the housing of each section has made therein a through cylindrical chamber accommodating for reciprocating a distributing slide or spool valve, the chamber being closed at the ends with closures limiting the reciprocation of the slide valve and defining with the latter two metering-out end chambers communicating each with the relieved or reduced-diameter area of the slide valve of the preceding section, a through central duct perpendicular to the axis of the cylindrical chamber and intersecting it, outlet ducts having their inlets communicating with the cylindrical chamber and their outlets adapted to supply the lubricant to respective friction couples, and a valveless end section, the sections being successively interconnected in the lubricant flow direction through the central duct, in which device, in accordance with the invention, in at least one distributing section the distributing slide valve is provided with means for rotating it about its axis through a predetermined angle and for retaining it in the thus rotated position; the housing of this section having made therein other outlet ducts having their respective inlets uniformly spaced about the perimeter of the cross-section of the wall of the cylindrical chamber, with the axes of said inlets dividing the circumference of the cross-section of said chamber into predetermined angles or arcs; the shoulders of the distributing slide valve of the same said section, facing the metering-out end chambers, having each made therein one distributing passage having its inlet communicating with the relieved area of the slide valve, and its outlet opening onto the external surface of said shoulder, so that with the distributing slide valve being in its extreme position of reciprocation, the outlet of one of the distributing passages communicates with the inlet of one of the outlet ducts, while the outlet of the other distributing passage is accommodated intermediate the respective inlets of the outlet ducts; the device further comprising means for monitoring the axial and angular position of the slide valve, mounted on the section and operatively connected with the slide valve.

It is expedient that the outlets of the outlet ducts of the distributing section wherein the slide valve is provided with the means for rotating it about its axis through a predetermined angle and for retaining it in the thus rotated position should be arranged in a single plane perpendicular to the axis of the cylindrical chamber, and should be accommodated in the external lateral surfaces of this distributing section.

This construction of the dosing device reduces its overall dimensions by enabling to cut down the number of the distributing sections, while maintaining the required number of the outlet ducts.

Moreover, the dosing device in accordance with the invention provides for substantial difference between the values of the flow rates by volume through the outlet ducts during the operating cycle of the dosing device. We understand here as the operating cycle of the dosing device the operating sequence after which every distributing valve is returned into its initial position.

The combination of distributing sections with non-rotatable and rotatable distributing valves enable to have different ratios of the flow rate values of the lubricant into the outlet ducts of the distributing sections during the full operating cycle of the dosing device, because with one and the same volume of the metering-out end chambers, the outlet ducts of the distributing sections with non-rotatable valves would receive the amount of lubricant as many times greater than the amount received by the outlet ducts of the distributing sections with rotatable valves, as there are angular positions into which the valves of the last-mentioned sections can be actuated.

It is expedient that the dosing device should include at least one intermediate valveless section interposed between two distributing sections of which at least one includes a distributing slide valve.

The incorporation of intermediate valveless sections and the use of the valveless head and end sections for accommodating the outlets of the outlet ducts in their external lateral surfaces reduce the overall dimensions of the dosing device, owing to fuller utilization of the metal of the structure.

In one embodiment of the invention, the means for rotating the slide valve about its axis through a predetermined angle and for retaining it in the rotated position includes teeth with a single bevel or taper arranged on the end faces of the distributing slide valve, with different directions of the bevel line relative to the axis of the valve, and similar teeth arranged on the end face of each closure, facing the end face of the slide valve, so that the latter in the extreme positions of its reciprocation defines a meshing couple with the respective closure, and with one couple thus engaged, the teeth of the other couple are spaced from one another through one half of the predetermined angle.

The use of the teeth with a single bevel or taper enables to convert a portion of the axial effort of actuating the distributing slide valve into a circumferential effort or torque, owing to the interaction of the apex of the respective tooth of the slide valve with the inclined plane defined by the bevel of the tooth of the closure, whereby the torque is applied to the slide valve, and the latter is subsequently retained in the predetermined angular position by the profile of the teeth.

It is further expedient that the means for monitoring the axial and angular position of the distributing valve should include a permanent magnet arranged eccentrically on a rod rigidly connected with the distributing valve and extending coaxially therewith, and a least one magnetically responsive element accommodated in a passage defined by the wall of a sleeve arranged coaxially with the closure and enclosing the latter therein, the contacts of this element being adapted to interact with the magnetic field of the permanent magnet in one of the angular and extreme axial positions of the distributing slide valve.

With one such magnetically responsive element incorporated, it is possible to monitor the completion by the dosing device of its operating cycle, i.e. the supply of the lubricant to every outlet duct.

With several such magnetically responsive elements used, in a number equalling the number of the angular positions of the distributing slide valve, it is possible to locate a failure area, i.e. clogging of either the outlet duct or the line connecting the outlet of this outlet duct with the respective friction couple, etc., and thus to minimize the time of repairing the failure, and, consequently, the downtime of the lubricated equipment.

It is further expedient that the closure and the sleve should be made of a non-magnetic materials.

It is further expedient that the dosing device should include at least one signal device arranged on the sleeve and electrically connected with a commutator connected to a voltage source and with the magnetically responsive element electrically connected with other commutator connected to a voltage source.

It is expedient that signal device should include light-emitting diodes (LEDs).

The arrangement of the signal devices directly on the dosing device significantly simplifies the assembling of the electric wiring of the dosing devices.

Other objects and advantages of the invention will be made apparent in the following description of its embodiments, with reference being made to the accompanying drawings, wherein:

FIG. 4 is a sectional view taken on line IV—IV of FIG. 1;

FIG. 6 is a sectional view taken on line VI—VI of FIG. 1;

FIG. 7 is a sectional view taken on line VII—VII of FIG. 1;

FIG. 8 is a sectional view taken on line VIII—VIII of FIG. 2, on an enlarged scale;

FIG. 16 is a partially sectional view taken on line XVI—XVI of FIG. 15;

FIG. 17 is a sectional view taken on line XVII—XVII of FIG. 15;

FIG. 18 is a sectional view taken on line XVIII—XVIII of FIG. 15;

FIG. 19 is a sectional view taken on line XIX—XIX of FIG. 15;

FIG. 20 is a sectional view taken on line XX—XX of FIG. 15;

FIG. 21 is a sectional view taken on line XXI—XXI of FIG. 15;

FIG. 22 is a sectional view taken on line XXII—XXII of FIG. 15;

FIG. 23 is a sectional view taken on line XXIII—XXIII of FIG. 22.

Figure 1:
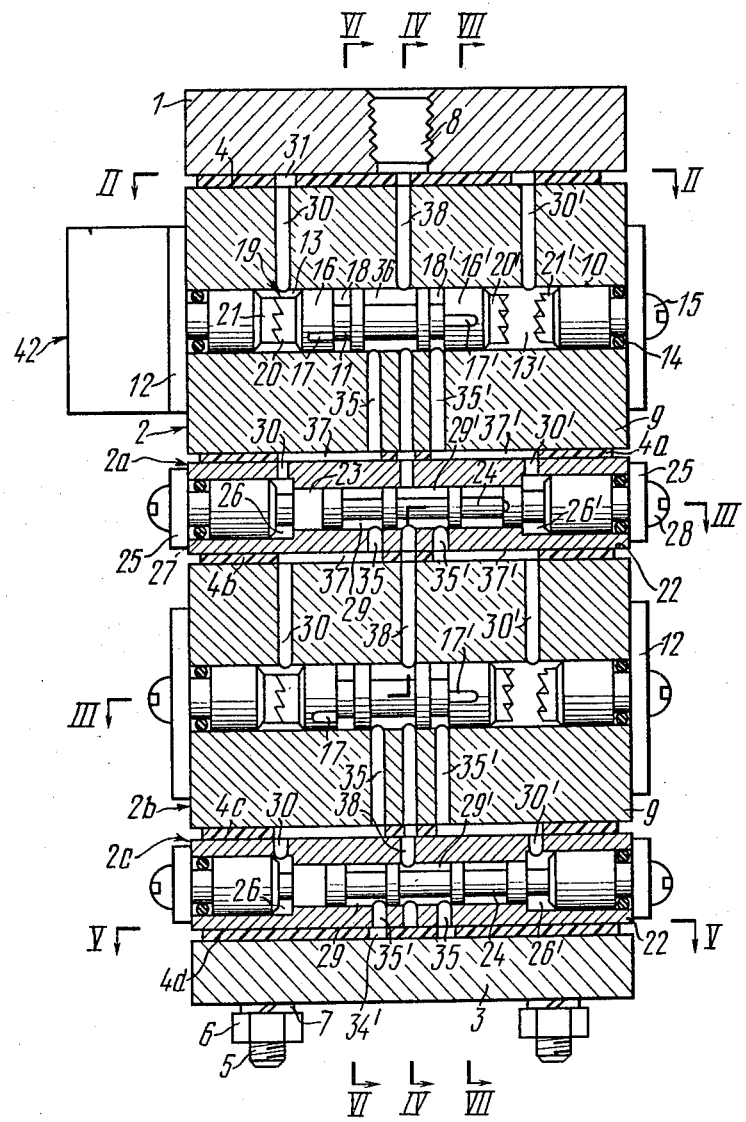
FIG. 1 is a schematic longitudinally sectional view of a dosing device for feeding lubricant to friction couples, embodying the invention.

The dosing device for feeding a lubricant to friction couples comprises a plurality of sections successively interconnected in the direction of the flow of the lubricant, viz. a valveless head section 1 (FIG. 1), distributing sections 2, 2a, 2b and 2c, and a valveless end section 3. Interposed between the sections 1, 2, 2a, 2b, 2c and 3 are respective sealing gaskets 4, 4a, 4b, 4c and 4d.

The sections are assembled into a unit with aid of threaded studs 5, nuts 6 and lock washers 7. The valveless head section 1 has made therein a central supply duct 8. The respective housing 9 of each distributing section 2 and 2b has made therein a through-going cylindrical chamber 10 accommodating therein a reciprocable distributing slide or spool valve 11. The chamber 10 has its opposite ends closed with respective closures 12 limiting the reciprocation of the distributing slide valve 11 and defining with the latter two metering-out end chambers 13 and 13'. To avoid leaking of the lubricant from the cylindrical chamber 10, rubber seal rings 14 are mounted at the ends of the closures 12. The closures 12 are secured to the housing 9 with aid of screws 15.

The shoulders 16 and 16' of the distributing slide valve 11, facing the metering-out end chambers 13 and 13', respectively, have made therein each a single distributing passage 17 and 17'. The inlet of each respective passage 17 and 17' communicates with the reduced-diameter or relieved area 18 and 18' of the slide valve 11. The outlet of each passage 17 and 17' opens onto the external surface of the respective shoulder 16 and 16'. The slide valve 11 is associated with means 19 for rotating it about its axis through a predetermined angle and retaining it in the thus rotated position.

These means 19 include teeth 20 and 20', each with a single-side bevel or taper, provided on the respective end faces of the distributing slide valve 11, and teeth 21 and 21', likewise each with a single-side bevel or taper, provided on the end face of each closure 12, facing the slide valve 11. The bevel lines of the teeth 20 and 21 on the opposite faces of the slide valve 11 are differently directed with respect of the longitudinal axis of the slide valve 11. The slide valve 11 is thus adapted in its extreme positions of reciprocation to define meshing couple with one of the closures 12, so that when one pair of the teeth 20 and 21 engage each other, the teeth 20' and 21' of the other pair are disengaged and angularly spaced from each other by one half of the predetermined angle, and vice versa.

Figure 3:
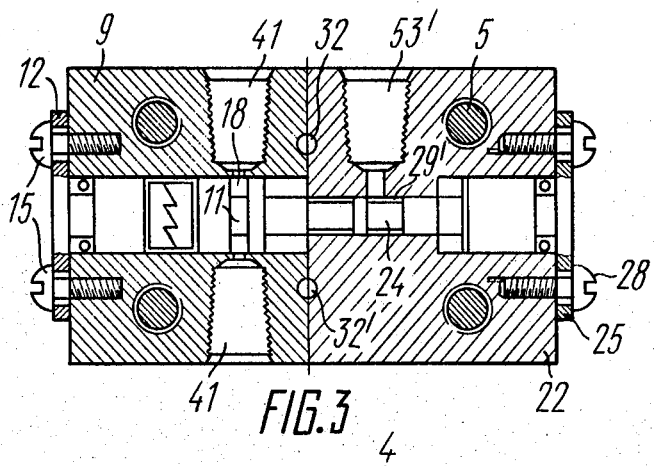
FIG. 3 is a sectional view taken on line III—III of FIG. 1.
Figure 2:
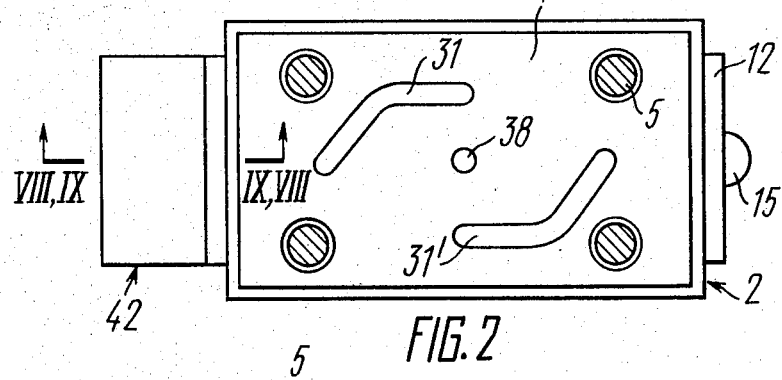
FIG. 2 is a sectional view taken on line II—II of FIG. 1.
Figure 5:
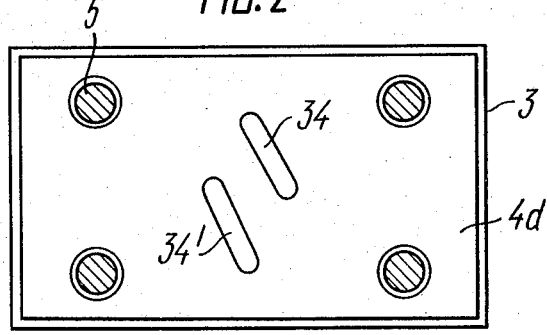
FIG. 5 is a sectional view taken on line V—V of FIG. 1.

The housing 22 of each one of the distributing sections 2a and 2c has made therein a through-going cylindrical chamber 23 accommodating therein a reciprocable slide or spool valve 24. The chamber 23 has its opposite ends closed with the respective closures 25 limiting the reciprocation of the distributing slide valve 24 and defining with the latter two metering-out end chambers 26 and 26'. To prevent leaking of the lubricant from the cylindrical chamber 23, rubber seal rings 27 are provided at the ends of the closures 25. The closures 25 are secured to the housing 22 by screws 28. Each metering-out end chamber 13 and 13' of the section 2 communicates with the relieved area 29' and 29, respectively, of the slide valve 24 of the section 2c which is the preceding or upstream one in the direction of the flow of the lubricant. The communication of the chamber 13 of the section 2 with the relieved area 29' of the section 2c is established through a duct 30 made in the housing 9, an opening 31 (FIG. 2) in the gasket 4, a duct 32 (FIG. 3) in the housing 9 of the sections 2 and 2b, and also in the housings 22 of the sections 2a and 2c, an opening 33 (FIG. 4) in the gaskets 4a, 4b and 4c, an opening 34 (FIG. 5) in the gasket 4d and a duct 35 (FIG. 1) made in the housing 22 of the section 2c. The communication of the chamber 13' of the section 2 with the relieved area 29 of the section 29c is established through a duct 30' made in the housing 9, an opening 31'(FIG. 2) in the gasket 4, a duct 32' (FIG. 3) in the respective housings 9 of the sections 2 and 2b, and in the housings 22 of the sections 2a and 2c, an opening 33' (FIG. 4) in the gaskets 4a, 4b and 4c, an opening 34' (FIG. 5) in the gasket 4d, and a duct 35' (FIG. 1) made in the housing 22 of the section 2c. The communication between the metering-out end chamber 26 of the section 2a and the relieved area 36 of the slide valve 11 of the section 2 is established through the duct 30 in the section 2a, an opening 37 in the gasket 4a, the duct 35 in the housing 9 of the section 2; while the communication between the metering-out end chamber 26' of the section 2a and the relieved area 18' of the slide valve 11 of the section 2 is established through the duct 30' in the housing 22 of the section 2a, an opening 37' in the gasket 4a and the duct 35'.

Extending through the gaskets 4, 4a, 4b and 4c, through the housings 9 of the sections 2 and 2b and through the housings 22 of the sections 2a and 2c is a through-going central duct 38 communicating with the central duct 8 of the head valveless section 1 and running normally to the cylindrical chambers 10 and 23, and intersecting them.

The distributing section 2 has made therein outlet ducts 39 (FIG. 6). The inlets 40 of the outlet ducts 39 are uniformly spaced about the perimeter of the cross-section of the wall of the cylindrical chamber 10, the axes of these inlets 40 dividing the circumference of the cross-section of the cylindrical chamber 10 into the predetermined equal central angles or arcs.

The outlets 41 of the ducts 39, intended for supplying the lubricant to the friction couples, belong to a single plane and open onto the external lateral surfaces of the distributing section 2.

Made in the same distributing section 2 are also other distributing ducts 39' (FIG. 7) whose inlets 40' are uniformly spaced about the perimeter of the cross-section of the wall of the cylindrical chamber 10 in its cross-sectional plane, the axes of these inlets 40' dividing the circumference of the cross-section of the cylindrical chamber 10 into the predetermined equal central angles or arcs. The outlets 41' of the ducts 39', intended for supplying the lubricant to the friction couples, belong to a single plane and open onto the external lateral surfaces of the section 2.

In the embodiment being described and illustrated, the slide valve 11 of the section 2 occupies the extreme l.h. position, its teeth 20 meshing with the teeth 21 of the closure 12, whereas the teeth 20' of the distributing slide valve 11 are disengaged from the teeth 21' of the respective closure 12, the distributing passage 17' connecting the inlet 40' (FIG. 7) of one of the outlet ducts 39' with the relieved area 18' (FIG. 1) of the slide valve 11.

The dosing device incorporates means 42 for monitoring the axial and angular position of the distributing slide valve 11. The means 42 are mounted on the section 2 and operatively connected with the slide valve 11. The means 42 include a permanent magnet 43 (FIG. 8) and a magnetically-responsive element 44. The permanent magnet is eccentrically secured on a rod 45 rigidly connected with the distributing slide valve 11 and extending concentrically therewith.

The magnetically-responsive element 44 is accommodated in a duct 46 provided in the valve of a closed-end sleeve 47. The latter is arranged coaxially with the closure 12 and encloses it. In the position occupied by the slide valve 11 in FIG. 8 and corresponding position of the permanent magnet 43, its magnetic field acts upon the contacts of the magnetically-responsive element 44. The closure 12 and the sleeve 47 are made of a non-magnetic material.

Figure 10:
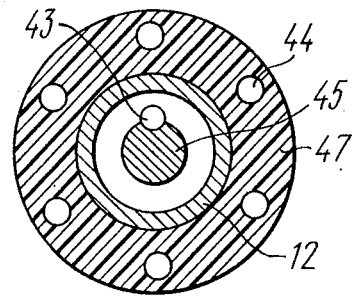
FIG. 10 is a sectional view taken on line X—X of FIG. 9.
Figure 11:
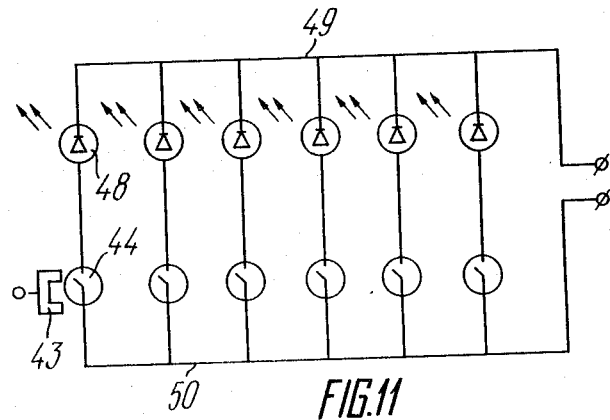
FIG. 11 is the circuit diagram of connecting the signal devices to the magnetically responsive elements of the dosing device and to an external circuit.

The dosing device further incorporates a signal or warning device 48 (FIG. 9), e.g. in the form of light-emitting diodes (LEDs). The LEDs are mounted on the sleeve 47, each being electrically connected with a commutator ring 49 and the magnetically-responsive element 44. The commutator ring 49 (FIG. 11) is connectable to a voltage source. The magnetically-responsive elements 44 (FIG. 10) are uniformly spaced about the perimeter of the sleeve 47, each element 44 being electrically connected to a commutator ring 50 connectable to a voltage source. The housing 22 of each respective section 2a and 2c has made therein outlet ducts 51 and 51' of which the inlets 52 and 52' communicate with the cylindrical chamber 23, and the outlets 53 and 53' open onto the external lateral surface of the housing 22.

The dosing device operates, as follows. The lubricant is fed under pressure through the central duct 8 (FIG. 1) of the valveless head section 1 into the central duct 38, wherefrom it flows through the relieved area 29' of the slide valve 24 of the section 2c, the duct 35 in the housing 22 of the same section, the opening 34 (FIG. 5) in the gasket 4d, the duct 32 (FIG. 4) in the housing 22 of the section 2c, the opening 33 in the gasket 4c, the duct 32 in the housing 9 of the section 2b, the opening 33 in the gasket 4b, the duct 32 in the housing 22 of the section 2a, the opening 33 in the gasket 4a, the duct 32 in the housing 9 of the section 2, the opening 31 in the gasket 4 and the duct 30 (FIG. 1) in the housing 9 of the section 2, into the metering-out end chamber 13 of the last-mentioned section. The pressure of the lubricant drives the respective slide valve 11 to the right, whereby the lubricant is forced from the opposite end chamber 13' into the duct 30', to flow through the opening 31' (FIG. 4) in the gasket 4, the duct 32' in the housing 9 of the section 2, the opening 33' in the gasket 4a, the duct 32' in the housing 22 of the section 2a, the opening 33' in the gasket 4b, the duct 32' in the housing 9 of the section 2b, the opening 33' in the gasket 4c, the duct 32' in the housing 22 of the section 2c, the opening 34' in the gasket 4d, the duct 35' (FIG. 1) in the housing 22 of the section 2c, the relieved area 29 of the slide valve 24, into the outlet duct 51 (FIG. 6). As the slide valve 11 (FIG. 1) is thus driven further on, its teeth 20' engage the teeth 21' of the respective closure 12, whereby a portion of the axial effort driving the slide valve 11 is converted into a circumferential effort or torque by the interaction of the apices of the teeth of the slide valve with the slanting planes of the teeth of the closure. This torque applied to the slide valve 11 rotates it through one half of the predetermined angle, in which rotated position it is retained by the profile of the teeth. Consequently, the distributing passage 17 in the shoulder portion 16 of the slide valve 11 establishes communication between the outlet 41 (FIG. 6) of the outlet duct 39 via the inlet 40 with the relieved area 18 (FIG. 1) of the slide valve 11, while the outlet of the distributing passage 17' occupies a position intermediate the adjacent inlets 40' (FIG. 7) of the outlet ducts 39, and the relieved area 36 (FIG. 1) of the slide valve 11 connects the central duct 38 with the duct 35' in the housing 9 of the section 2. Thus, the lubricant under pressure is supplied through the opening 37' in the gasket 4a and the duct 30' in the housing 22 of the section 2a into the metering-out end chamber 26', whereby its slide valve 24 is driven to the left. The lubricant is thus fed from the metering-out chamber 26 via the duct 30 in the housing 22 of the section 2a, the opening 37 in the gasket 4a, the duct 35 in the housing 9 of the section 2 into the relieved area 18 of the slide valve 11. Then the lubricant flows toward the outlet 41 (FIG. 6) of one of the outlet ducts 39. The slide valves of the rest of the sections successively operate in a similar way, whereby the lubricant is fed successively into all the outlet ducts, which completes the operating cycle of the dosing device.

Upon the slide valve 11 (FIG. 8) returning into its initial position, the magnetic field of the permanent magnet 43 acts upon the contacts of the magnetically-responsive element 44, which latter sends out a signal representative of the completion of the operating cycle by the dosing device.

Figure 9:
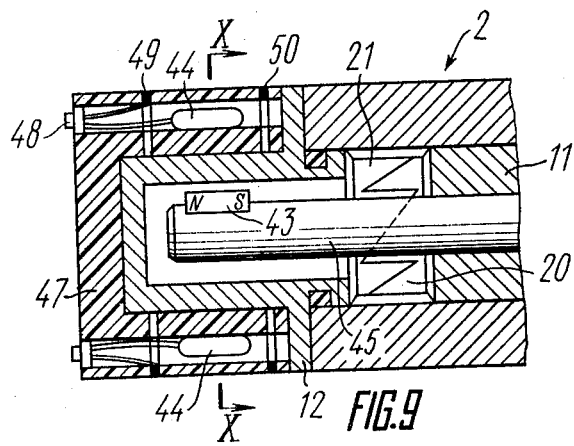
FIG. 9 is a sectional view taken on line IX—IX of FIG. 2, on an enlarged scale.

In embodiments incorporating several magnetically-responsive elements 44 (FIG. 9) in a number corresponding to the number of the angular positions, e.g. of the slide valve 11 (FIG. 7), it becomes possible to locate a failure point, e.g. the clogging either of one of the outlet ducts 39' or of their respective supply lines (not shown) connecting the outlet 41' of this duct 39' with the respective friction couple, by the warning given by the LEDs 48 (FIG. 9).

A distributing slide valve associated with means rotating it about its axis through a predetermined angle and retaining it in the thus rotated position, as it has been described hereinabove, can be incorporated in twin-line dosing devices.

Figure 12:
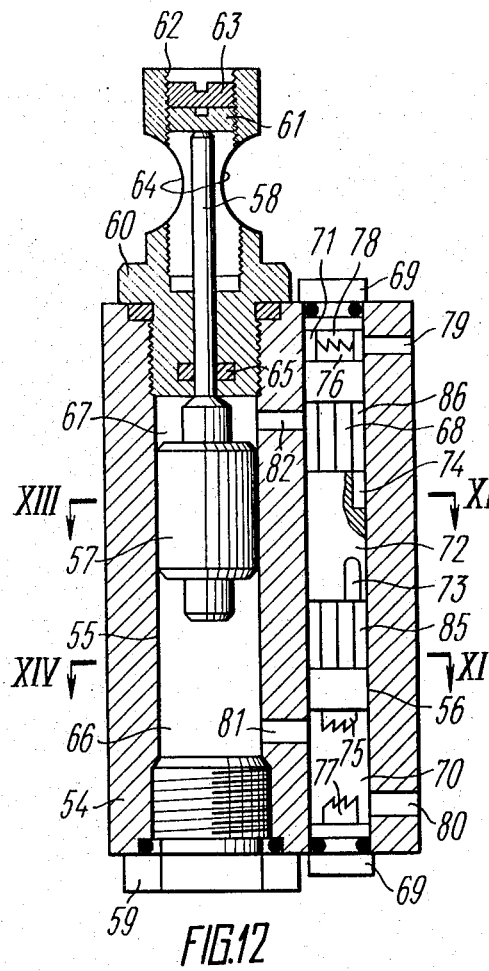
FIG. 12 is a schematic longitudinally sectional view of a twin-line dosing device for feeding lubricant to friction couples, wherein the distributing slide valve is constructed in accordance with the invention.

The twin-line dosing device schematically illustrated in FIG. 12 has a housing 54 having made therein two through-going cylindrical chambers 55 and 56, their longitudinal axes being parallel.

The chamber 55 accommodates a reciprocating piston 57 with a piston rod 58. The chamber 55 is closed at one end with a closure 59 and at the other end by a lid 60. The closure 59 limits the stroke of the piston 57 in one direction, while its motion in the opposite direction is limited by a screw 61 received in a threaded bore 62 of the lid 60, with a screw 63 provided to lock the screw 61. The lid 60 has ports 64 made therein for viewing the operation of the piston 57 with the piston rod 58. To prevent leaking of the lubricant along the piston rod 58, the lid 60 is provided with a seal 65. The piston 57 defines with the closure 59 a metering-out end chamber 66, and defines with the lid 60 a metering-out end chamber 67. The chamber 56 accommodates a reciprocable and rotatable distributing slide or spool valve 68. The chamber 56 is closed at its ends by the closures 69 which limit the reciprocation of the slide valve 68 and define therewith two metering-out end chambers 70 and 71. To prevent leaking of the lubricant from the cylindrical chambers 55 and 56, seal rings are provided at the respective ends of the closures 69, 59 and of the lid 60. The shoulder portion 72 of the slide valve 68 has made therein two distributing passages 73 and 74 angularly displaced relative to each other through one half of the predetermined angle. The end faces of the slide valve 68 are provided with single-bevel teeth 75 and 76, while the respective end faces of the closures 69, facing the end faces of the slide valve 68, are provided with single-bevel teeth 77 and 78. The bevels of the teeth 75 and 76 are differently indexed relative to the longitudinal axis of the slide valve 68, i.e. their bevels have opposite senses. The slide valve 68 is thus adapted to define meshing couples with either closure 69 in its respective extreme position of reciprocation; when one couple of teeth 78 and 76 engage one another, the teeth 75 and 77 of the second couple are disengaged and spaced from one another by one half of the predetermined angle.

The housing 54 has made therein an inlet duct 79 and an inlet duct 80, intended for communication with the distributor of a twin-line system (not shown). The metering-out end chamber 66 communicates with the cylindrical chamber 56 via a duct 81, while the metering-out end chamber 67 communicates with the same chamber 56 via a duct 82. The housing 54 has made therein outlet ducts 83 (FIG. 13) and 84 (FIG. 14) of which the respective inlets are uniformly angularly spaced in the wall of the cylindrical chamber in a plane of the latter's cross-section, the axes of these inlets dividing the circumference of the cross-section of the chamber into the predetermined central angles or arcs. The outlets ducts 83 and 84 open onto the external lateral surfaces of the housing 54.

Figure 13:
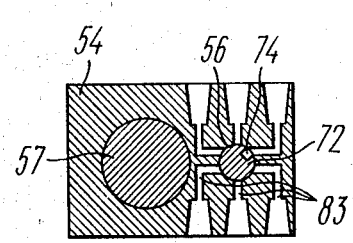
FIG. 13 is a sectional view taken on line XIII—XIII of FIG. 12.
Figure 14:
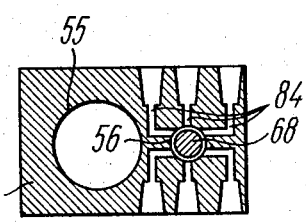
FIG. 14 is a sectional view taken on line XIV—XIV of FIG. 12.

The twin-line dosing device operates, as follows. The lubricant under pressure is fed via the duct 79 (FIG. 12) into the end chamber 71, whereby the slide valve 68 is driven downwardly, and the chamber 56 communicates via the duct 82 with the metering-out end chamber 67. The pressure of the lubricant drives the piston 57 downwardly. The slide valve 68 moves down until the teeth 75 engage the teeth 77 of the respective closure 69, whereafter a portion of the axial effort applied to the slide valve 68 is converted into a torque by the interaction of the apices of the teeth of the slide valve with the slanting planes or bevels of the teeth of the closure. This torque applied to the slide valve 68 rotates it through one half of the predetermined angle, in which rotated position it is retained by the profile of the meshing teeth. Now the distributing passage 73 in the shoulder 72 of the slide valve 68 communicates with one of the inlets of the outlet ducts 84 (FIG. 14). The lubricant is supplied from the metering-out end chamber 66 (FIG. 12) via the duct 81 into the relieved area 85 communicating with the distributing passage 73. The duct 80 is connected to drain. When the lubricant is supplied via the duct 80, it flows into the end chamber 70, wherefrom it flows via the duct 81 into the metering-out chamber 66. The piston 57 is driven upwardly by the pressure of the lubricant until the piston rod 58 abuts against the screw 61. The slide valve 68 is driven upwardly, and the teeth 76 engage the teeth 78 of the respective closure 69. The torque thus applied to the slide valve 68 rotates the latter through one half of the predetermined angle, in which position it is retained. Now the distributing passage 74 (FIG. 13) in the shoulder 72 of the slide valve 68 communicates with one of the inlets of the outlet ducts 83, and the lubricant is supplied from the metering-out end chamber 67 (FIG. 12) via the duct 82, the relieved area 86 and the distributing passage 74 toward the outlets of the outlet ducts 83 (FIG. 13).

Figure 15:
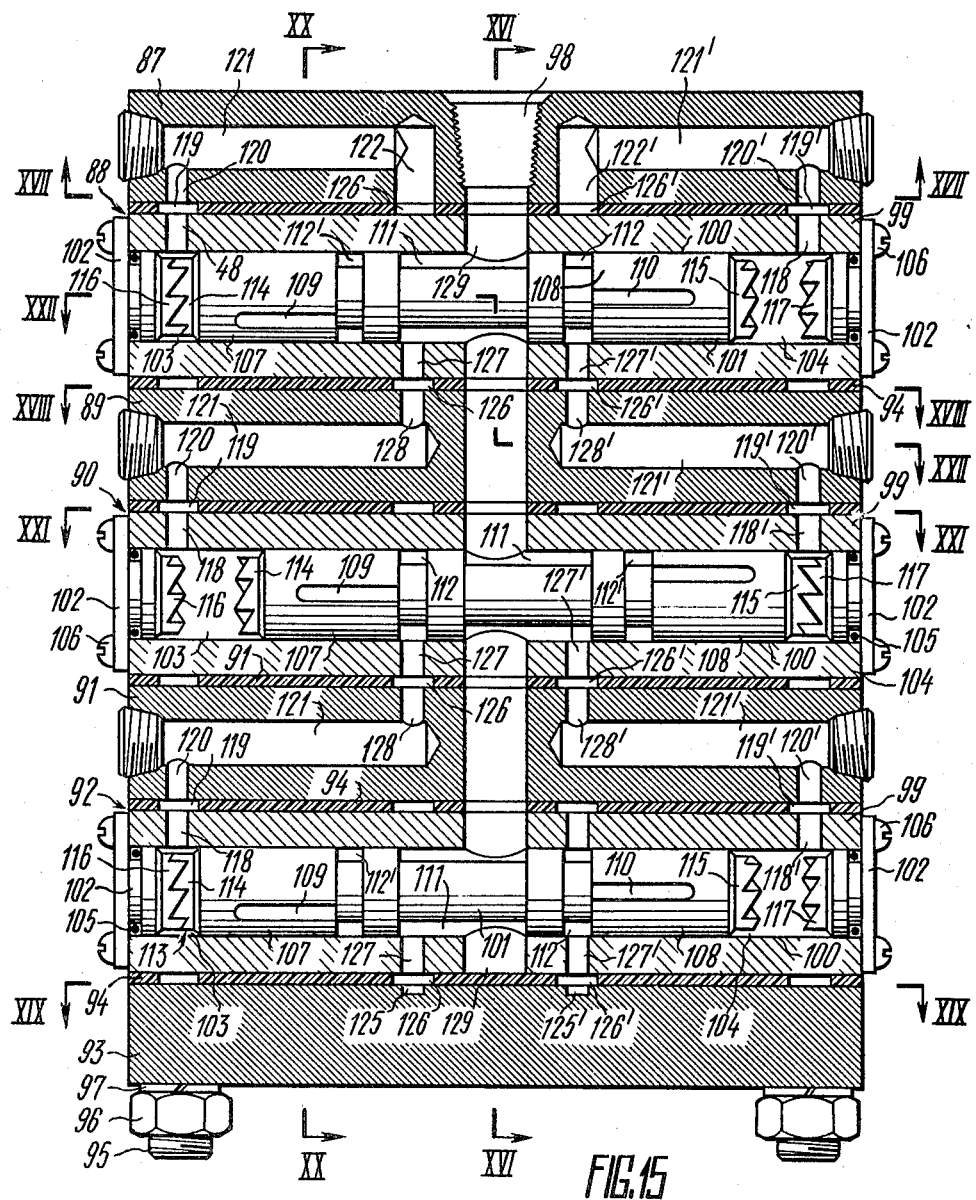
FIG. 15 is a schematic longitudinally sectional view of the embodiment of a single line dosing device for feeding lubricant to friction couples, according to the invention.

With a view to reducing the overall dimensions of the dosing device while maintaining the required number of the outlet ducts, it is advantageous to use a single line dosing device, whose embodiment is illustrated in FIG. 15. The single line dosing device comprises a plurality of sections successively interconnected in the direction of the flow of the lubricant, viz. a valveless head section 87, a distributing section 88, an intermediate valveless section 89, a distributing section 90, an intermediate valveless section 91, a distributing section 92 and a valveless end section 93. Interposed between the sections 87, 88, 89, 90, 91, 92, and 93 are sealing gaskets 94. The sections are assembled into a unit with aid of threaded studs 95, nuts 96 and lock washers 97.

The valveless head section 87 has made therein a central supply duct 98. The respective housing 99 of each distributing section 88, 90, 92 has made therein a through-going cylindrical chamber 100 accommodating therein a reciprocable distributing slide or spool valve 101. The chamber 100 has its opposite ends closed with respective closures 102 limiting the reciprocation of the distributing slide valve 101 and defining with the latter two metering-out end chambers 103 and 104. To avoid leaking of the lubricant from the cylindrical chamber 100, rubber seal rings 105 are mounted at the ends of the closures 102. The closures 102 are secured to the housing 99 with aid of screws 106. The shoulders 107 and 108 of the distributing slide valve 101, facing the metering-out end chambers 103 and 104, respectively, have made therein each a single distributing passage 109 and 110. The inlet of each respective passage 109 and 110 communicates with the reduced-diameter or relieved area 111 and 112 of the slide valve 101. The outlet of each passage 109 and 110 opens onto the external surface of the respective shoulder 107 and 108. The slide valve 101 is associated with means 113 for rotating it about its axis through a predetermined angle, which is essentially a predetermined central angle, and retaining it in this position. These means 113 include teeth 114 and 115, each with a single-side bevel or taper, provided on the respective end faces of the distributing slide valve 101, and teeth 116 and 117, each with a single-side bevel or taper, provided on the end face of each closure 102, facing the slide valve 101.

The bevel lines of the teeth 114 and 115 are differently directed with respect to the longitudinal axis of the slide valve 101. The slide valve 101 is adapted in its extreme positions of reciprocation to define meshing couple with each of the closures 102, so that when one pair of the teeth 114 and 116 engage each other, the teeth 115 and 117 of the other pair are disengaged and angularly spaced from each other by one half of the predetermined angle. Each metering-out end chamber 103 of the distributing sections 88 and 90 and the metering-out end chamber 104 of the distributing section 92 communicates with the relieved area 111 of the slide valve 101 of the section which is the preceding or upstream one in the direction of the flow of the lubricant.

The communication of the chamber 103 of the distributing section 88 with the relieved area 111 of the slide valve 101 of the distributing section 92 is established through a duct 118 made in the housing of the section 88, an opening 119 in the gasket 94, ducts 120, 121, 122 and 123 (FIG. 16) in the housing of the head section 87, a duct 124 made in all the gaskets 94, the housings 99 of the distributing sections 88, 90 and 92 and housings of valveless intermediate sections 89 and 91, a duct 125 made in the end section 93, an opening 126 (FIG. 15) in the gasket 94, and a duct 127 in the housing 99 of the section 92.

Communication of the chamber 103 of the distributing section 90 with the relieved area 111 of the slide valve 101 of the distributing section 88 is established through the duct 118 in the housing 99 of the section 90, the opening 119 in the gasket 94, the ducts 120, 121, 128 in the housing of the section 89, the opening 126 in the gasket 94 and the duct 127 in the housing 99 of the distributing section 88. Communication of the chamber 104 of the distributing chamber 92 with the relieved area 111 of the slide valve 101 of the distributing section 90 is established through a duct 118 in the housing 99 of the section 92, opening 119 in the gasket 94, ducts 120', 121' and 128' in the housing of the intermediate section 91, an opening 126' in the gasket 94 and a duct 127' in the housing 99 of the distributing section 90.

Each of the metering-out end chambers 104 of the distributing section 88 and 90 and the metering-out end chamber 103 of the distributing section 92 communicate with the relieved areas 112 of the slide valve 101 of a preceding or upstream section in the direction of the flow of the lubricant.

Communication of the chamber 104 of the distributing section 88 with the relieved area 112 of the slide valve 101 of the distributing section 92 is established through the duct 118' in the housing 99 of the section 88, the opening 119' in the gasket 94, ducts 120', 121', 122' and 123' (FIG. 17) in the head section 87, a duct 124' (FIG. 18) made in all gaskets 94, the housings 99 of the distributing sections 88, 90 and 92 and the housings of the valveless intermediate sections 89 and 91, a duct 125' (FIG. 19) in the housing of the end section 93, the opening 126' (FIG. 15) in the gasket 94, and the duct 127' in the housing 99 of the section 92.

Communication of the chamber 104 of the distributing section 90 with the relieved area 112 of the slide valve 101 of the distributing section 88 is established through the duct 118' in the housing 99 of the section 90, the opening 119' in the gasket 94, the ducts 120', 121' and 128' in the housing of the section 89, the opening 126' in the gasket 94 and the duct 127' in the housing 99 of the distributing section 88.

Communication of the chamber 103 of the distributing section 92 with the relieved area 112 of the slide valve 101 of the distributing section 90 is established through the duct 118 in the housing 99 of the section 92, the opening 119 in the gasket 94, the ducts 120, 121 and 128 in the housing of the section 91, the opening 126 in the gasket 94 and the duct 127 in the housing 99 of the distributing section 90.

Extending through the gaskets 94, housings 99 of the distributing sections 88, 90 and 92 and through the valveless intermediate sections 89 and 91 is a through-going central duct 129 communicating with the central duct 98 of the head valveless section 87 and running normally to the cylindrical chambers 100, and intersecting them.

The distributing sections 88, 90 and 92 have made therein outlet ducts 130 and 131 (FIG. 20). The inlets 132 of the outlet ducts 130 and 131 are uniformly spaced about the perimeter of the cross section of the wall of the cylindrical chamber 100, the axes of these inlets 132 dividing the circumference of the cross-section of the cylindrical chamber 100 into the predetermined equal central angles or arcs.

The outlets 133 of the ducts 130 intended for supplying the lubricant to the friction couples open onto the external lateral surfaces of the housings 99 of the distributing sections 88, 90 and 92.

The outlets 134 of the ducts 131 open onto abutting surfaces of the housings 99 of the distributing sections 88, 90 and 92 and communicate with the inlets 136 of ducts 137 made in the housings of the valveless sections 87, 89, 91 and 93, through openings 135 provided in the gaskets 94. The outlets 138 of the ducts 137 adapted to supply the lubricant to the friction couples open onto the external lateral surfaces of the housings of the valveless sections 87, 89, 91 and 93. The same distributing sections 88, 90 and 92 are also provided with outlet ducts 130' (not shown in the drawing) and 131' (FIG. 21). The inlets 132' (not shown in the drawing) of the ducts 130' and 131' are uniformly spaced about the perimeter of the cross section of the cylindrical chamber 100 (FIG. 15), the axes of these inlets 132' dividing the circumference of the cross section of the chamber 100 into the predetermined equal central angles. The outlets 133' (not shown in the drawings) of the ducts 130', intended for supplying the lubricant to the friction couples, open onto the external lateral surfaces 99 of the distributing sections 88, 90 and 92.

The outlets 134' (FIG. 21) of the ducts 131' open onto abutting surfaces of the housings 99 of the distributing sections 88, 90, 92 and communicate with inlets 136' (FIG. 17 and 19) of ducts 137' (FIG. 22) made in the housings of the valveless sections 87, 89, 91 and 93, through the openings 135' (FIG. 18) provided in the gaskets 94.

The outlets 138' of the ducts 137' intended for supplying the lubricant to the friction couples, open onto the external lateral surfaces of the housings of the valveless sections 87, 89, 91 and 93 (FIG. 15).

In the embodiment being described, the slide valves 101 of the distributing sections 88 and 92 occupy the extreme l.h. position, the teeth 114 thereof meshing with the teeth 116 of the closures 102, whereas the teeth 115 of the distributing slide valves 101 are disengaged from the teeth 117 of the respective closures 102, the distributing passage 110 putting the inlet 132' (not shown in the drawing) of one of the outlet ducts 130' (not shown in the drawing) or the inlet 131' (FIG. 21) into communication with the relieved area 112 (FIG. 15) of the slide valve 101.

The slide valve 101 of the distributing section 90 occupies the extreme r.h. position, its teeth 115 meshing with the teeth 117 of the closure 102, whereas the teeth 114 of the slide valve 101 are disengaged from the teeth 116 of the closure 102, the distributing passage 109 communicating the inlet 132 (FIG. 20) of one of the outlet ducts 130 with the relieved area 112 (FIG. 15) of the slide valve 101.

The dosing device operates as follows. The lubricant is fed under pressure through the central duct 98 (FIG. 15) of the valveless head section 87 into the central duct 129, wherefrom it flows through the relieved area 111 of the slide valve 101 of the section 92, the duct 127 in the housing of the same section, the opening 126 in the gasket 94, the duct 125 (FIG. 19) in the housing of the end section 93, the duct 124 (FIG. 16) in the housings of the sections 92, 91, 90, 89, 88 and in the gaskets 94, the duct 123 (FIG. 17), the ducts 122, 121 (FIG. 15) and 20 in the housing of the head section 87, the opening 119 in the gasket 94 and the duct 118 in the housing 99 of the sections 88, into the metering-out end chamber 103.

The pressure of the lubricant drives the slide valve 101 to the right. The lubricant is forced from the metering chamber 104 through the duct 118' in the housing 99 of the section 88, opening 119' in the gasket 94, the ducts 120', 121' and 122 of the section 87, the duct 123' (FIG. 17) in the housing of the section 87, the duct 124' (FIG. 18), the duct 125' (FIG. 19) of the section 93, the opening 126' (FIG. 15) in the gasket 94, the duct 127' in the housing 99 of the section 92, the relieved area 112 of the slide valve 101, the duct 110 made therein, into the outlets 133' (not shown in the drawing) or 138' (FIGS. 22, 23) through one of the outlet ducts 131' (FIG. 21).

As the slide valve 101 (FIG. 15) is thus driven further on, its teeth 115 engage the teeth 117 of the closure 102. A part of the axial effort driving the slide valve 101 is converted into a circumferential effort or torque due to the interaction of the apices of the slide valve teeth with the slanting planes of the teeth of the closure. This torque applied to the slide valve 101 rotates it through one half of the predetermined angle, in which position it is retained by the profile of the teeth. As a consequence, the distributing passage 109 establishes communication between one of the outlet ducts 131 (FIG. 20) with the relieved area 112' (FIG. 15) of the slide valve 101. The outlet of the distributing passage 111 occupies a position intermediate outlets 132' (not shown in the drawing) of the outlet ducts 131' (FIG. 21) and the relieved area 111 (FIG. 15) of the slide valve 101 puts the central duct 129 into communication with the duct 127' in the housing 99 of the section 88, whereby the lubricant under pressure is supplied through the opening 126' in the gasket 94, the ducts 128', 121', 120' in the housing of the section 89, the opening 119' in the gasket 94 and the duct 118' in the housing 99 of the distributing section 90, into the metering-out end chamber 104. The slide valve 101 of the distributing section 90 is thus driven to the left in a way similar to that of the slide valve 101 of the section 88.

The slide valves of the rest of the sections successively operate in a similar way, whereby the lubricant is fed successively into all the outlet ducts, which completes the operating cycle of the dosing device.

What we claim is:

1. A dosing device for feeding a lubricant to friction couples, comprising:
a valveless head section;
a plurality of distributing sections;
a valveless end section, said sections being successively interconnected in the direction of the lubricant flow;
a central supply duct provided in said valveless head section;
each said distributing section having its respective housing;
a through-going cylindrical chamber made in said housing of each said distributing section;
a distributing slide valve with reduced-diameter relieved areas, accommodated for reciprocation in said through cylindrical chamber made in said housing of each said distributing section;
two closures closing from the ends each said through cylindrical chamber, limiting the reciprocation of said respective distributing slide valve and defining therewith two respective metering-out end chambers, each one of said two metering-out end chambers communicating with one of the relieved areas of said distributing slide valve of the preceding upstream one of said distributing sections in the direction of the lubricant flow;
a central through-going duct made in said housing of each said distributing section, extending normally to the axis of said cylindrical through chamber and intersecting it;
outlet ducts made in said housing of each said distributing section;
the inlets of said outlet ducts connected to said through cylindrical chamber made in said housing of each respective one of said distributing sections;
the outlets of said outlet ducts adapted to supply the lubricant to the friction couples, opening onto the external lateral surface of said housing of each respective one of said distributing sections;
means for rotating one of said distributing slide valves about the axis thereof through a predetermined angle and for retaining it in the thus rotated position, mounted on one of said distributing slide valves and provided in at least one of said distributing sections;
other outlet ducts made in said housing of said at least one section accommodating said distributing slide valve provided with said means for rotating it through a predetermined angle and retaining it in the thus rotated position; the inlets of said other outlet ducts belonging to a single plane and being uniformly angularly spaced about the perimeter of the cross-section of the wall of said through cylindrical chamber, with the geometric axes of said inlets dividing the circumference of the cross-section of said cylindrical chamber into predetermined angles; the outlets of said other outlet ducts belonging to a single plane normal to the axis of said through cylindrical chamber and opening onto the lateral surfaces of said distributing section;

two distributing passages made each in the shoulder portion of at least one of said distributing slide valves provided with said means for rotating it through a predetermined angle and for retaining it in the thus rotated position, facing the respective one of said two metering-out end chambers, the inlet of each one of said distributing passages communicating with the relieved area of said respective slide valve, and the outlet of each one of said two distributing passages opening onto the external surface of the shoulder portion of said respective distributing slide valve; said outlet of one of said distributing passages communicating with one of said inlets of said outlets ducts in the extreme position of reciprocation of said respective slide valve, while said outlet of the other one of said distributing passages is accommodated intermediate said inlets of said outlet ducts in the same aforementioned position of said respective distributing slide valve; means for monitoring the axial and angular positions of said distributing slide valve, mounted on one of said distributing sections and operatively connected with said distributing slide valve.

2. A dosing device for feeding a lubricant to friction couples, as set forth in claim 1, wherein said means for monitoring the axial and angular position of said distributing slide valve comprise:
a rod rigidly connected with said distributing slide valve and arranged concentrically therewith;
at least one permanent magnet eccentrically supported by said rod and secured thereto;
a closed-end sleeve arranged coaxially with one of said two closures and enclosing it;
a passage made in said sleeve;
at least one magnetically-responsive element accommodated in said passage;
the contacts of said at least one magnetically-responsive element, adapted to interact with the magnetic field of said at least one permanent magnet in one of the angular and extreme axial positions of said distributing slide valve.

3. A dosing device of claim 2, wherein said closure and said closed-end sleeve are made of a non-magnetic material.

4. A dosing device of claim 2, wherein said means for monitoring the axial and angular position of said distributing slide valve include:
first commutator means connectable to a voltage source;
second commutator means connectable to a voltage source;
a signal device mounted on said closed-end sleeve and electrically connected with said first commutator means and with said magnetically-responsive element, the latter being electrically connected with said second commutator means.

5. A dosing device of claim 4, wherein said signal device includes a light-emitting diode.

6. A dosing device for feeding a lubricant to friction couples, as set forth in claim 1, wherein said means for rotating said distributing slide valve about the axis thereof through a predetermined angle and for retaining it in the thus rotated position include teeth with single-side bevels, provided on the end faces of said distributing slide valve, with the bevels of said teeth on the opposite end faces being differently oriented relative to the axis of said slide valve, and teeth with single-side bevels provided on the end faces of each one of said two closures, facing the respective ones of said end faces of said distributing slide valve, the latter defining a meshing couple with the respective ones of said closures in the extreme positions of its reciprocation, so that when one such couple is engaged, the teeth of the other couple are spaced from one another by one half of the predetermined angle.

7. A dosing device for feeding a lubricant to friction couples, as set forth in claim 6, wherein said means for monitoring the axial and angular position of said distributing slide valve comprise:
a rod rigidly connected with said distributing slide valve and arranged concentrically therewith;
at least one permanent magnet eccentrically supported by said rod and secured thereto;
a closed-end sleeve arranged coaxially with one of said two closures and enclosing it;
a passage made in said sleeve;
at least one magnetically-responsive element accommodated in said passage;
the contacts of said at least one magnetically-responsive element, adapted to interact with the magnetic field of said at least one permanent magnet in one of the angular and extreme axial positions of said distributing slide valve.

8. A dosing device of claim 7, wherein said closure and said closed-end sleeve are made of a non-magnetic material.

9. A dosing device for feeding a lubricant to friction couples, comprising:
a valveless head section;
a plurality of distributing sections;
a valveless end section, said sections being successively interconnected in the direction of the lubricant flow;
a central supply duct provided in said valveless head section;
each said respective distributing section having its respective housing;
a through-going cylindrical chamber made in said housing of each said distributing section;
a distributing slide valve with reduced-diameter relieved areas, accommodated for reciprocation in said through cylindrical chamber made in said housing of each said distributing section;
two closures closing from the ends each said through cylindrical chamber, limiting the reciprocation of said distributing slide valve and defining therewith two respective metering-out end chambers, each one of said two metering-out end chambers communicating with one of the relieved areas of said distributing slide valve of the preceding upstream one of said distributing sections in the direction of the lubricant flow;
a central through-going duct made in said housing of each said distributing section, extending normally to the axis of said cylindrical through chamber and intersecting it;
outlet ducts made in said housing of each said distributing section;
the inlets of said outlet ducts connected to said through cylindrical chamber made in said housing of each respective one of said distributing sections;

the outlets of said outlet ducts adapted to supply the lubricant to the friction couples, opening onto the lateral surface of said housing of each respective one of said distributing sections;

means for rotating one of said distributing slide valves about the axis thereof through a predetermined angle and for retaining it in the thus rotated position, mounted on one of said distributing slide valves and provided in at least one of said distributing sections;

at least one intermediate valveless section interposed between two said distributing sections of which at least one accommodates said distributing slide valve provided with said means for rotating it about the axis thereof through a predetermined angle for retaining it in the thus rotated position, adjoining the junction surfaces of said last-mentioned two distributing sections;

a central through-going duct made in said at least one intermediate valveless section, coaxial with the central through duct of said distributing sections;

two connection ducts made in said valveless head and end sections and in said at least one intermediate valveless section, each one of said two connection ducts connecting said end chamber of the downstream one of said distributing sections to the relieved area of said distributing slide valve of the upstream one of said distributing sections, in the direction of the lubricant flow;

other outlet ducts made in said housing of at least one of said distributing sections with said distributing slide valve provided with said means for rotating it about the axis thereof through a predetermined angle and for retaining it in the thus rotated position; the inlets of said other outlet ducts belonging to a single plane and being uniformly angularly spaced about the perimeter of the cross-section of the wall of said respective through cylindrical chamber, with the geometric axes of said inlets dividing the circumference of the cross-section of said respective cylindrical chamber into the predetermined angles; some of the outlets of said other outlet ducts communicating with said connection ducts and opening onto the external lateral surface of said valveless section adjoining said distributing section with said distributing slide valve provided with said means for rotating it about the axis thereof through a predetermined angle and for retaining it in the thus rotated position; other outlets of said other outlet ducts opening onto another external lateral surface of said housing of said distributing section;

two distributing passages made each in the shoulder portion of at least one of said distributing slide valves provided with said means for rotating it through a predetermined angle and for retaining it in the thus rotated position, facing the respective one of said two metering-out end chambers; the inlet of each one of said two distributing passages communicating with the relieved area of said respective distributing slide valve; the outlet of each one of said two distributing passages opening onto the external surface of the shoulder portion of said respective distributing slide valve; said outlet of one of said distributing passages communicating with one of said inlets of said outlet ducts when said respective distributing slide valve is in the extreme position of its reciprocation, while said outlet of the other one of said distributing passages is situated intermediate said inlets of said outlet ducts in the same aforementioned position of said respective distributing slide valve;

means for monitoring the axial and angular position of said distributing slide valve, mounted on one of said distributing sections and operatively connected with said distributing slide valve.

10. A dosing device for feeding a lubricant to friction couples, as set forth in claim 9, wherein said means for rotating said distributing slide valve about the axis thereof through a predetermined angle and for retaining it in the thus rotated position include teeth with single-side bevels, provided on the end faces of said distributing slide valve, with the bevels of said teeth on the opposite end faces being differently oriented relative to the axis of said slide valve, and teeth with single-side bevels provided on the end faces of each one of said two closures, facing the respective ones of said end faces of said distributing slide valve, the latter defining a meshing couple with the respective ones of said closures in the extreme positions of its reciprocation, so that when one such couple is engaged, the teeth of the other couple are spaced from one another by one half of the predetermined angle.

11. A dosing device for feeding a lubricant to friction couples, as set forth in claim 10, wherein said means for monitoring the axial and angular position of said distributing slide valve comprise:

a rod rigidly connected with said distributing slide valve and arranged concentrically therewith;

at least one permanent magnet eccentrically supported by said rod and secured thereto;

a closed-end sleeve arranged coaxially with one of said two closures and enclosing it;

a passage made in said sleeve;

at least one magnetically-responsive element accommodated in said passage;

the contacts of said at least one magnetically-responsive element, adapted to interact with the magnetic field of said at least one permanent magnet in one of the angular and extreme axial positions of said distributing slide valve.

12. A dosing device of claim 11, wherein said closure and said closed-end sleeve are made of a non-magnetic material.

13. A dosing device for feeding a lubricant to friction couples, as set forth in claim 9, wherein said means for monitoring the axial and angular position of said distributing slide valve comprise:

a rod rigidly connected with said distributing slide valve and arranged concentrically therewith;

at least one permanent magnet eccentrically supported by said rod and secured thereto;

a closed-end sleeve arranged coaxially with one of said two closures and enclosing it;

a passage made in said sleeve;

at least one magnetically-responsive element accommodated in said passage;

the contacts of said at least one magnetically-responsive element, adapted to interact with the magnetic field of said at least one permanent magnet in one of the angular and extreme axial positions of said distributing slide valve.

14. A dosing device of claim 13, wherein said closure and said closed-end sleeve are made of a non-magnetic material.

15. A dosing device of claim 13, wherein said means for monitoring the axial and angular position of said distributing slide valve include:
first commutator means connectable to a voltage source;
second commutator means connectable to a voltage source;
a signal device mounted on said closed-end sleeve and electrically connected with said first commutator means and with said magnetically-responsive element, the latter being electrically connected with said second commutator means.

16. A dosing device of claim 15, wherein said signal device includes a light-emitting diode.

* * * * *